(12) United States Patent
Vaananen

(10) Patent No.: US 11,128,374 B2
(45) Date of Patent: *Sep. 21, 2021

(54) FULLY PHOTONIC WIRELESS BROADBAND BASE STATION

(71) Applicant: Mikko Vaananen, Helsinki (FI)

(72) Inventor: Mikko Vaananen, Helsinki (FI)

(73) Assignee: Mikko Vaananen, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/711,574

(22) Filed: Dec. 12, 2019

(65) Prior Publication Data

US 2021/0184767 A1    Jun. 17, 2021

(30) Foreign Application Priority Data

May 12, 2011 (EP) .................................. 11165821

(51) Int. Cl.
*H04B 10/00* (2013.01)
*H04B 10/112* (2013.01)
(Continued)

(52) U.S. Cl.
CPC ......... *H04B 10/1129* (2013.01); *H04B 10/27* (2013.01); *H04B 10/40* (2013.01); *H04W 52/0206* (2013.01)

(58) Field of Classification Search
CPC .... H04B 10/1129; H04B 10/27; H04B 10/40; H04W 52/0206
(Continued)

(56) References Cited

U.S. PATENT DOCUMENTS

| | | | |
|---|---|---|---|
| 5,493,436 A | | 2/1996 | Karasawa et al. |
| 6,128,512 A | * | 10/2000 | Trompower ........... H04B 1/707 375/E1.002 |

(Continued)

FOREIGN PATENT DOCUMENTS

| | | |
|---|---|---|
| EP | 1476968 A1 | 11/2004 |
| EP | 1890386 A1 | 2/2008 |

(Continued)

OTHER PUBLICATIONS

Martini, R. et al., "High-speed modulation and free-space optical audio/video transmission using quantum cascade asers," vol. 37, No. 3, Feb. 1, 2001, pp. 191-193.
(Continued)

*Primary Examiner* — Mohammad R Sedighian
*Assistant Examiner* — M R Sedighian
(74) *Attorney, Agent, or Firm* — Mikko Vaananen

(57) ABSTRACT

The invention relates to base stations in communication networks. In more particular the invention relates to cellular base stations such as 3G/4G and WLAN base stations. Some or all of the aforementioned advantages of the invention are accrued with a fully photonic base station (200) that powers itself with solar photons, provides radio network access and relays an optical photonic beam (220, 221, 230, 231) through air encoded with the data from radio signals of computer users and mobile phone users to the Internet and the global telecommunication network. A system engineer can build a network with the inventive base stations in a matter of days. He simply walks to the roof of houses and points the optical beams to other base stations in adjacent houses.

7 Claims, 3 Drawing Sheets

(51) Int. Cl.
*H04B 10/40* (2013.01)
*H04W 52/02* (2009.01)
*H04B 10/27* (2013.01)

(58) Field of Classification Search
USPC .................................................... 398/115
See application file for complete search history.

(56) References Cited

U.S. PATENT DOCUMENTS

| | | | |
|---|---|---|---|
| 6,323,980 | B1 | 11/2001 | Bloom |
| 7,542,682 | B2 * | 6/2009 | Donati ................. H03C 7/025 398/141 |
| 8,655,180 | B2 * | 2/2014 | Vaananen ............. H04W 16/18 398/130 |
| 2002/0097471 | A1 | 7/2002 | Bethea et al. |
| 2002/0181444 | A1 | 12/2002 | Acampora |
| 2005/0158059 | A1 | 7/2005 | Vaananen |
| 2006/0098593 | A1 | 5/2006 | Edvardsen et al. |
| 2008/0292320 | A1 | 11/2008 | Pederson |
| 2009/0180781 | A1 | 7/2009 | Harper et al. |
| 2010/0260084 | A1 | 10/2010 | Imamura et al. |
| 2010/0313934 | A1 | 12/2010 | Vaananen |
| 2011/0064026 | A1 * | 3/2011 | Niedermeier ............ H04Q 9/00 370/328 |

FOREIGN PATENT DOCUMENTS

| | | |
|---|---|---|
| EP | 2224782 A1 | 9/2010 |
| EP | 2261996 B1 | 5/2011 |
| EP | 2226852 B1 | 7/2011 |
| WO | 94/17605 A1 | 8/1994 |
| WO | 99/45665 A1 | 9/1999 |
| WO | 01/33747 A1 | 5/2001 |
| WO | WO 01/33747 A1 * | 5/2001 ............. H04B 10/10 |
| WO | 03/047130 A1 | 6/2003 |
| WO | 2006/044519 A2 | 4/2006 |
| WO | 2006129239 A1 | 12/2006 |
| WO | 2008/122558 A2 | 10/2008 |
| WO | 2009/043662 A2 | 4/2009 |
| WO | 2011/017764 A1 | 2/2011 |

OTHER PUBLICATIONS

Cool Base Station—Regenerative and autonomous supplied femto base stations, Technische Universitat Dresden, Oct. 2010, XP055091888, retreived from https://mms.ifn.et.tu-dresden.de/Lists/CustomlistDefinitions-ProjectlistInstance/Attachments/4/projects cool_base_stations.pdf.
Extended European Search Report dated Sep. 22, 2011 in European Patent Application No. 11165821.7.
International Search Report and Written Opinion dated Aug. 14, 2012 in International Patent Application No. PCT/FI2012/050355.
Non-Final Office Action dated Sep. 26, 2014 in U.S. Appl. No. 14/137,004.
Non-Final Office Action dated Dec. 30, 2015 in U.S. Appl. No. 14/137,004.
Non-Final Office Action dated Jul. 8, 2019 in U.S. Appl. No. 14/137,004.
Final Office Action dated Oct. 1, 2015 in U.S. Appl. No. 14/137,004.
Final Office Action dated Jul. 15, 2016 in U.S. Appl. No. 14/137,004.
Non-Final Office Action dated Jul. 6, 2012 in U.S. Appl. No. 13/457,852.
Non-Final Office Action dated Jun. 21, 2013 in U.S. Appl. No. 13/457,852.
Final Office Action dated Jan. 2, 2013 in U.S. Appl. No. 13/457,852.

* cited by examiner

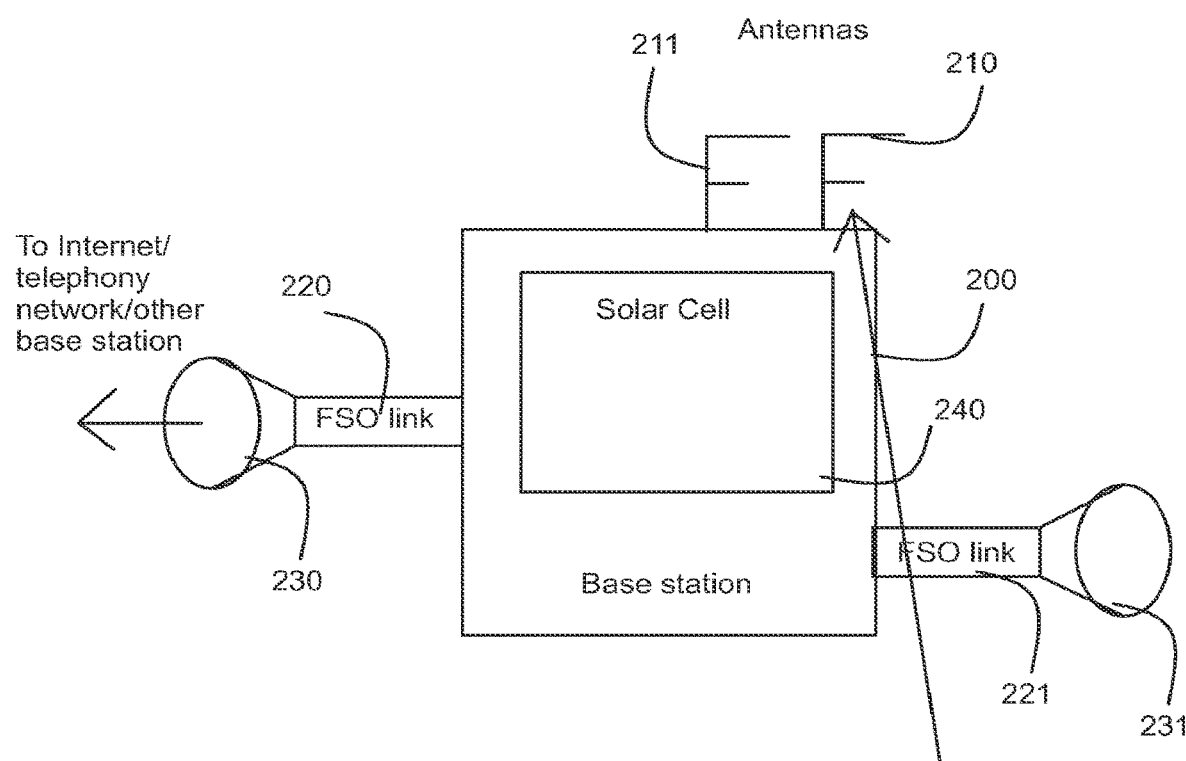
FIG 2.
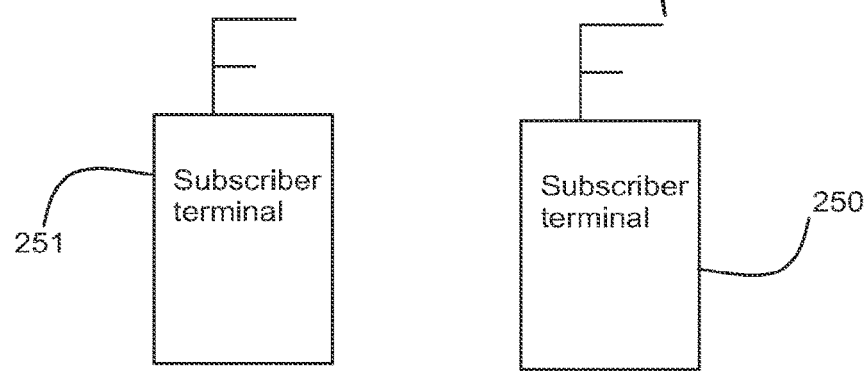

FULLY PHOTONIC WIRELESS BROADBAND BASE STATION

TECHNICAL FIELD OF INVENTION

The invention relates to base stations in communication networks. In more particular the invention relates to cellular base stations such as 3G/4G and WLAN base stations.

BACKGROUND

The famous last mile problem has been the greatest unsolved problem in telecommunication since the days of Thomas Alva Edison and Alexander Bell. This problem, of course, reads as follows: more than 90% of all people are within a mile from an access point to the global telecommunication network. However, more than 99% of the cost is spent accessing that last mile, i.e. digging up roads and laying wires and optical fibres to households and base stations to transfer data and deliver power to them.

Even further, when one operator has put up the capital to reach that last mile to the customer, it becomes practically impossible for new competing operators to start competing by building another access solution to the customer. The original operator can always price its service temporarily so, that it is uneconomical to the competing operator to incur the capital outlay cost of a competing last mile connection in a situation that might lead to price competition, but still the capital outlay cost that the original operator invested is producing a hefty return on investment. Needless to say, several competition laws and government watchdogs have been implemented to steer this monopolistic market dynamic to more free competition.

In the prior art it is known that solar cells have been used to power light houses, for example on the Baltic Sea.

In the prior art it is also known that free space optics connections can be used to replace optical fibre connections, by shooting a laser beam from one building to another.

In the prior art it is also known that free space optics connections have been realised in space from scientific satellites that have been powered by solar panels.

WO2006/044519 discusses radio-to-fibre conversion and mentions solar cell powered picocells.

The prior art techniques are incapable of solving the last mile problem.

SUMMARY

The invention under study is directed towards a system and a method for effectively creating a base station that is completely void of external wire connections, thereby solving the last mile problem.

A further object of the invention is to present a 3G/4G/LTE/WLAN (3$^{rd}$ Generation, 4$^{th}$ Generation, Long Term Evolution, Wireless Local Area Network) communication network that can be built at a fraction of the cost of conventional communication networks.

An even further object of the invention is to better enable telecommunications operators new to a particular market to start competing with existing original operators, thereby driving down cost in that market.

One aspect of the invention involves a fully photonic cellular base station that can be placed e.g. on the roof of a building, and made fully operational in 10 minutes without any infrastructure improving work. The inventive base station is powered by one or more solar cells, and therefore does not need a grid electricity connection. The solar cells typically charge a battery and/or have at least one low band gap photodiode layer, so that excess power during intense sunlight is stored in the battery to power the base station at night and times of cloudy weather. The low band gap material is designed to produce some electricity even in cloudy weather when no high energy photons are present in sufficient quantity. One such low band gap material is InSb, with a band gap of 0.17 eV (electrovolts). The base station further has a laser communication link that transmits an optical beam through the air to avoid the need of installing optical fibres or other communication wires. The laser light is typically generated by a semiconductor photodiode. One of the laser transmitters is typically a quantum cascade laser that transmits very low energy photons, which are not as easily scattered by advection fog. The inventor received the European patent EP 1 476 968 B1 for the weather resilient FSO (free space optics) link, and this publication is cited here as reference. Any laser transceiver described therein can be used to realise the optical link of the inventive base station in this application. In one aspect of the invention the optical communication link is not realised with a laser, but instead with a conventional photodiode, such as a LED (Light Emitting Diode).

The laser link transmitter is typically pointed to an optical receiver, so that a line of sight connection is formed. The base station further has radio transceivers such as WCDMA (Wideband Code Division Multiple Access)/3G/4G/LTE transceivers or WLAN (Wireless Local Area Network) transceivers. The subscriber terminals of users such as consumers and businesses access the network of the base station by communicating on the frequencies of the said transceivers.

A competing telecommunication operator will first put an optical transceiver e.g. on the roof of a building that hosts its exchange, central office (CO) and/or access point to a core optical network. The competing operator service person will then take the base station of the invention, and transport it to a nearby roof of another building with a line of sight connection to the optical transceiver at the core optical network access point. The base station will be positioned and/or focused so that the optical laser communication link is formed between the base station and the optical transceiver at the core optical network. The base station will then connect to subscriber terminal by providing radio network coverage in its proximity. Phone, Mobile phone, computer, television, radio and/or laptop computer users will simply form a radio and/or microwave connection to the base station, which will send data onwards to and from the subscriber terminals with the optical laser link, connecting said subscriber terminals to the international telecommunication network and/or Internet, with first the radio/microwave connection to the base station and then the free space optical connection to the optical core network.

Also in a preferred aspect of the invention the base station has a plurality of optical laser links, forming a network with other optical transceivers. This type of a mesh network configuration allows signals to reroute if the line of sight connection is lost for some reason between two base stations. However, the light beam is typically expanded, for example with a telescope, to a diameter that is sufficiently large that a bird cannot block the entire beam.

Some or all of the aforementioned advantages of the invention are accrued with a fully photonic base station that powers itself with solar photons, provides radio network access to subscriber terminals and sends a photonic beam encoded with the data from radio signals of subscriber terminals, such as computer users and mobile phone users, to the Internet and/or the global and/or local telecommunication network. A system engineer can build a network with the inventive base stations to a city like Helsinki (1 million inhabitants) in a matter of days. He simply walks to the roofs of houses and points the optical beams to other base stations in adjacent houses. A visit to a roof will take roughly 10 minutes.

A transceiver base station in accordance with the invention providing access to a radio and/or microwave communication network via at least one radio transceiver is characterised in that,
said base station comprises an optical data communication link arranged to transmit photons through free space,
said base station comprises at least one solar cell.

A transceiver base station in accordance with the invention is arranged to provide radio and/or microwave communication network access to at least one subscriber terminal via at least one radio and/or microwave transceiver and characterised in that,
said base station comprises at least one laser and/or photodiode data communication link arranged to transmit and/or receive photons through free space,
said base station comprises at least one solar cell.

A base station in accordance with the invention is arranged to provide radio and/or microwave communication network access to at least one subscriber terminal via at least one radio and/or microwave transmitter and/or receiver and is characterised in that,
said base station comprises at least one laser and/or photodiode data communication transmitter and/or receiver arranged to transmit and/or receive photons through free space,
said base station comprises at least one solar cell.

A method of providing communication network access in accordance with the invention by operating a network of radio and/or microwave base stations offering communication network access to a plurality of subscriber terminals via a radio and/or microwave connection, comprising the following steps:
powering said base stations with at least one solar cell in the same locations as the said base stations,
connecting said base station to a communication network with an optical data communication link through free space.

A method of providing communication network access in accordance with the invention by operating at least one base station offering communication network access to a plurality of subscriber terminals via a radio and/or microwave connection comprises the following steps:
powering said at least one base station with at least one solar cell in the same location as the base station,
connecting said base station to a communication network with at least one laser and/or photodiode data communication link through free space.

"Radio" and "microwave" are in this application construed as the part of the electromagnetic spectrum where the radiation source acts as an essentially non-directional (radiates to all directions) point radiator.

"Optical" is in this application construed as the part of the electromagnetic spectrum which can be produced by photodiode emission. Thus "optical" is not limited to the visible spectrum in this application, but can reach to 70,000 nm and beyond, which is the current highest wavelength that can be achieved by quantum cascade lasers. Also, the term optical is to comprise those laser wavelengths that provide directional radiation with other lasing mediums, such as gas lasers. These wavelengths still relate to photons that require a line of sight connection, i.e. are directional. The optical band is thus to be construed as 100 nm to 1 mm in this application, comprising the UV, visible and the infrared.

In one exemplary embodiment of the invention, the optical wavelengths of the base station are between 1-100 micron, and WLAN and GSM wavelengths are 0.1-0.2 m. Roughly, this means that the optical connection can package the data of 1000-100000 WLAN and/or GSM connections, or other similar radio and/or microwave connections with its higher frequency.

"Data communication link" in this application is construed as data that is electronically modulated to the signal, e.g. an optical signal. Hence, a person flashing a flashlight, or a lighthouse providing a warning light is not understood as a data communication link in this application.

"Same location" in this application is construed as physically and/or mechanically attached to the same device, and/or connected with a wire at the same address. I.e. providing solar electricity with the power grid from a distant solar panel would not be in the same location as construed in this application.

"Free space" is generally construed as air in this application, but could also comprise water for underwater applications, and/or space and/or vacuum for space and/or laboratory applications. Hence, an optical fibre or other waveguide such as copper cable is not construed as free space in this application. However, an optical fibre, mirror, or other waveguide can be used to lead the optical beam out of the base station to free space in accordance with the invention. For example an approximately 10 cm section of a waveguide leading out of the base station is in accordance with the invention and handy and practical for pointing the beam that is arranged to traverse through free space to the receiver. I.e. it is in accordance with the invention for the system engineer to e.g. twist such a waveguide so that the optical beam points to the desired receiver with a clear line of sight.

In a preferred embodiment the base station is quite small, typically the size of the current WLAN base stations, i.e. 0.1-2 kg. In one preferred embodiment the inventive base station provides a "plug and play" functionality, i.e. it becomes automatically operational as soon as it is turned on. To provide this functionality, the base station may be arranged to automatically provide and/or acquire at least one network address, e.g. at least one IP address, and/or the like network configuration data to/from at least one subscriber terminal, at least one another base station, and/or at least one router or other device in the optical network.

In one aspect of the invention, the radio/microwave cell size is quite small 10-50 m, and the backhaul free space optical link is reasonably long 50-1000 m. This is especially preferable because it allows for a very low power base station, as transmission powers can be controlled within the limits of the power provided by the solar cells, even though the solar cells are quite small in area.

The invention quite clearly offers great synergistic advantages that go beyond the sum of its parts. Using a FSO (free space optics) solution individually relieves the network operator from the need to build optical cables to the base station, but wire infrastructure would still need to be built, i.e. power cords. Similarly using the solar cell for a network base station relieves the operator from making sure grid electricity is available, but again an optical fibre would need to be built. The invention allows the system engineer merely to only request authorisation from the tenants to place the base station on the roof. There is no need to consult the tenants for permissions to conduct infrastructural changes to the building itself, such as providing a power cord to the roof, or allowing for optical fibre wiring. The inventor has calculated that this saving should exceed more than 5000 Euros/building, which is the standard quoted rate that large telecommunications companies cite as the cost of connecting a central Helsinki building to optical broadband, when fibre is available.

In one embodiment the base station is realised as a personal or household level version. The user just puts the base station on his window sill or roof, and points its free space optical link to an optical transceiver and/or base station nearby and realises wireless broadband at his household or office.

Furthermore, the inventive base station is very cheap to manufacture in large quantities. Therefore it has the added advantage that the cell size served by the base station can be made very small. This allows for the introduction of quite small very broadband, high bandwidth, radio cells. These small very high bandwidth radio cells have the advantage that they can be used to substitute an optical fibre connection to a residential or office unit. In some embodiments the range of the base station is about 10-100 m to cover one residence. In one embodiment the range is about 500 m, which is arranged as sufficient to reach from the roof of a skyscraper to street level.

In addition and with reference to the aforementioned advantage accruing embodiments, the best mode of the invention is considered to be a fully photonic base station that provides radio/microwave network access such as WLAN-, LTE-, 3G-/4G-access to mobile phones and computers.

BRIEF DESCRIPTION OF THE DRAWINGS

In the following the invention will be described in greater detail with reference to exemplary embodiments in accordance with the accompanying drawings, in which FIG. 1 demonstrates an embodiment of the method of operating the inventive base station as a flow diagram.

FIG. 2 demonstrates an embodiment 20 of the base station in accordance with the invention as a block diagram.

Some of the embodiments are described in the dependent claims.

DETAILED DESCRIPTION OF EMBODIMENTS

Figure 1:
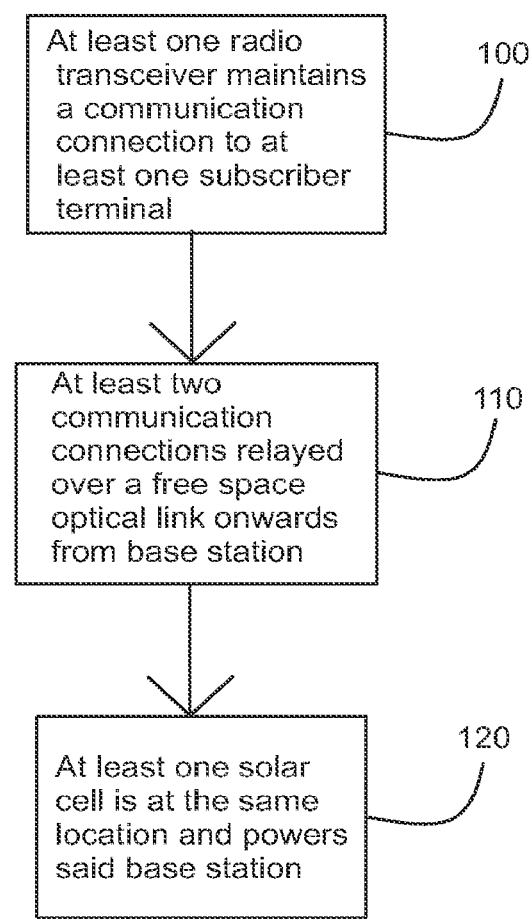

FIG. 1 shows the operation of an embodiment 10 of the inventive method as a flow diagram. In phase 100 at least one radio transceiver of a base station maintains a communication connection to at least one subscriber terminal. The subscriber terminal is typically a mobile phone and/or a computer that is connected to the base station transceiver with its own radio transceiver. The connection between the transceivers is typically a wireless data connection such as a WLAN-, GPRS-, 3G-, 4G- and/or WCDMA, but can also be a circuit switched telephony connection, such as GSM, CDMA or the like mobile telephony connection. In some embodiments the connection between the base station and the subscriber terminal can also be a proprietary communication connection, packet based- and/or circuit switched connection in accordance with the invention. For example military applications and temporary data connections used for emergency services or big sports or entertainment events at temporary locations are also in accordance with the invention.

The subscriber terminal is typically a phone, a mobile phone, a PDA (personal digital assistant), a laptop computer, a television, a video set, a radio and/or computer. In some embodiments the subscriber terminal may use any operating system such as MacOS, Microsoft Windows and/or Linux or the like.

Typically one base station provides communication access to several subscriber terminals that are within range of the radio and/or microwave transceiver. In phase 110 at least two communication connections from at least two subscriber terminals are received and relayed onwards using a free space optical link (FSO). For example the phone conversations of three people with three different subscriber terminals each can be packed into the same free space optical connection as an Internet connection from a computer accessing the base station using e.g. the WLAN protocol or any other wireless data communication protocol.

The free space optical link is typically realised with a laser transceiver that abides to an existing optical networking protocol, such as SONET and/or SDH to name a couple of examples. In some embodiments the base station has a WLAN⇔SONET adapter, or a similar radio/microwave communication signal⇔optical communication signal adapter, such as a WCDMA⇔SONET, or the like adapter.

In phase 120 at least one solar cell is at the same location and powers said base station. The solar cell is typically a photovoltaic solar cell, and the base station is preferably outdoors to maximise incoming solar energy. However, the invention can be used with the base station and the solar cell indoors also. In some embodiments the solar cell is designed to produce electricity from photons emitted by indoor lighting very efficiently. This is typically done so that the band gap of the solar cell is adjusted to or close to the peak of the intensity in the indoor lights.

The solar powered base station thus relays typically non-visible optical rays to other base stations and optical transceivers connected to the core optical network. There is typically no power cord, or no optical fibre, or other communication or power wires going into the base station. The base station is simply a box that needs to be placed so that:

a) the surface with the solar cell receives solar light radiation, b) there is a line of sight connection to another base station and/or optical transceiver.

Consequently, all the hard work needed in setting up base stations can be replaced by mere clever positioning of the base station in accordance with the invention.

It should be noted that any features, phases or parts of the method 10 can be freely permuted and combined with embodiments 20 and/or 30 in accordance with the invention.

FIG. 2 shows an embodiment 20 of the inventive base station as a block diagram. The base station 200 typically has one or more antennas 210, 211 for transmitting and/or receiving radio signals to and from at least one subscriber terminal(s) 250, 251. The antennas can be any size in accordance with the invention. However, the antennas are preferably quite small to increase the portability of the truly wireless inventive base station 200. For example for a GSM and/or WLAN base station the antennas could be in the centimetres size scale in some preferable embodiments, to correspond with the wavelengths of 0.167 m and 0.12 m respectively.

Any data sent from the subscriber terminals to the base station over radio and/or microwave is formatted and modulated to a form that can be optically sent onwards from the base station. The radio signals are modulated into an optical signal that is sent with a FSO (free space optics) link 220. The FSO link will typically be realised by laser photodiodes that emit photons in the wavelength range from visible to about 100,000 nm. In order to achieve a dynamic range from 1550 nm to 70,000 nm one alternative is to use a normal SONET/SDH optical transceiver for the 1550 nm optical channel and have a longer wavelength channel as a backup for inclement weather, such as advection fog, utilising a quantum cascade laser (QCL), as explained in my patent EP 1 476 968 B1. The inventor is currently aware that QCL lasers can reach to 70,000 nm. In a preferred embodiment of the invention the QCL laser is similarly modulated in accordance with the same optical communication standard as the shorter conventional photodiode laser, for example using SONET and/or SDH. In one embodiment of the invention at least one optical communication link 220, 221 is not realised with a laser, but instead with a conventional photodiode, such as a LED (Light Emitting Diode).

In some embodiments the base station 200 comprises several FSO links 220, 221 that enable the base station 200 to send and receive optical signals to different directions. In some embodiments the base station not only joins the radio and/or microwave signals from the subscriber terminals in its own cell, i.e. within the range of its radio transceivers, but it also joins optical signals received from one or more other base stations and relays both the incoming radio and optical signals onwards. Quite clearly any incoming optical signal destined to the subscriber terminals in the cell of the base station can also be formatted to a form suited for radio signaling and communicated to the subscriber terminals in the cell of the base station.

Quite clearly it is in accordance with the invention to relay the radio signals from the subscriber terminals optically to any network, such as the Internet, telephony network, or any other data network, such as a proprietary and/or closed data network. Quite clearly both mobile wireless radio and wireless radio can be supported by the base stations in accordance with the invention. The base stations can be programmed to support cell to cell mobility, i.e. dynamic handovers from cell to cell by network management software, as implemented with prior art cellular phone networks for example.

The base station 200 is powered by at least one solar cell 200. The solar cell is typically a tandem solar cell, which has a higher efficiency per unit area, so that the base station can be made as light and to have as powerful photovoltaic solar cell as possible. In a preferred embodiment of the invention, the base station is quite flat, with the top surface housing the solar cell and facing the sky and the incident sunlight. The sides of the base station have the optical links 220, 221. It is also possible in some embodiments to have at least one externally protruding waveguide or waveguides, typically an optical waveguide, lead out from the base station. This waveguide and/or these waveguides are used point at least one beam of an optical link 220, 221, and the said at least one waveguide and/or waveguides can be twisted and/or positioned so as to direct the optical beam in accordance with the invention. This feature is advantageous in configuring the optical beams to provide network access fast on the roof of a building. As explained earlier, there can be many wavelengths in the optical link 220, 221, for example 1550 nm from a standard SONET laser and 70,000 nm from a QCL laser. These wavelengths typically require different waveguides, and in one embodiment the waveguide is arranged so that it has two co-axial waveguides in it, one for the shorter and one for the longer wavelength. Naturally there can be any number of waveguides for different wavelengths within one waveguide. It is in accordance with the invention to realize a waveguide in and/or to the base station that hosts several waveguides for different wavelengths, for example in a stacked or co-axial configuration. The at least one antenna is/are preferably built into the base station 200.

The solar cell 240 can be made from any of the following materials: Si (Silicon), polycrystalline silicon, thin-film silicon, amorphous silicon, Ge (Germanium), GaAs (Gallium Arsenide), GaAlAs (Gallium Aluminum Arsenide), GaAlAs/GaAs, GaP (Gallium Phosphide), InGaAs (Indium Gallium Arsenic), InP (Indium phosphide), InGaAs/InP, GaAsP (Gallium Arsenic Phosphide) GaAsP/GaP, CdS (Cadmium Sulphide), CIS (Copper Indium Diselenide), CdTe (Cadmium Telluride), InGaP (Indium Gallium Phosphide) AlGaInP (Aluminium Gallium Iridium Phosphide), InSb (Indium Antimonide), CIGS (Copper Indium/Gallium diselenide) and/or InGaN (Indium Gallium Nitride) in accordance with the invention. Further, it is in accordance with the invention to use any of the solar cells listed in European Patents EP2261996 and EP 2226852 and European applications EP08735694.5 and EP08803499.6 of the inventor to power the base station 200 in accordance with the invention.

In some embodiments the solar cell produces DC current, and an AC/DC adapter is provided in the base station 200 to convert the solar cell output current to AC for use of one or more electronic components in said base station 200.

At least one optical link 220, 221 is typically equipped with a beam expander 230, 231. The beam expander is typically used to expand the beam to a preferred size so that birds that get into the beam do not block the signal and small motion due to wind, insects or the like do not cause a full misalignment of the beam from the transceiver to which it is pointed to. In some embodiments the beam expander is a telescope with lenses. It is in accordance with the invention that different beam expansion designs and/or materials are used for photons of different wavelengths in accordance with the invention to accommodate short and long wavelengths.

In some embodiments the optical link 220, 221 may also feature a collimator device.

In some embodiments the pointing and the beam expansion of the optical links 230, 231, is adjustable, so that the system engineer can quickly position the base station so that it receives enough sunlight and has the optical links pointed to the correct other transceivers in the network. In some embodiments the optical link 220, 221, may comprise a retroreflector, typically arranged to provide optical feedback for correctly pointing a transmitter beam to a receiver in free space. It is in accordance with the invention to provide a retroreflector and/or a detector of reflected optical radiation in the base station, and/or at one end, the other end, or both ends of the free space optical link.

As said earlier, one or more laser emitters of different wavelengths can be used in the same or different optical links to make sure that the optical connections are maintained in different weather and visibility conditions. In one embodiment there are two different optical links to the same direction, having different optics. One optical link for the conventional 1550 nm communication laser or the like, and another optical link for the quantum cascade laser QCL that has a considerably longer wavelength.

It should be noted that any features, phases or parts of the method 20 can be freely permuted and combined with embodiments 10 and/or 30 in accordance with the invention.

Figure 3:
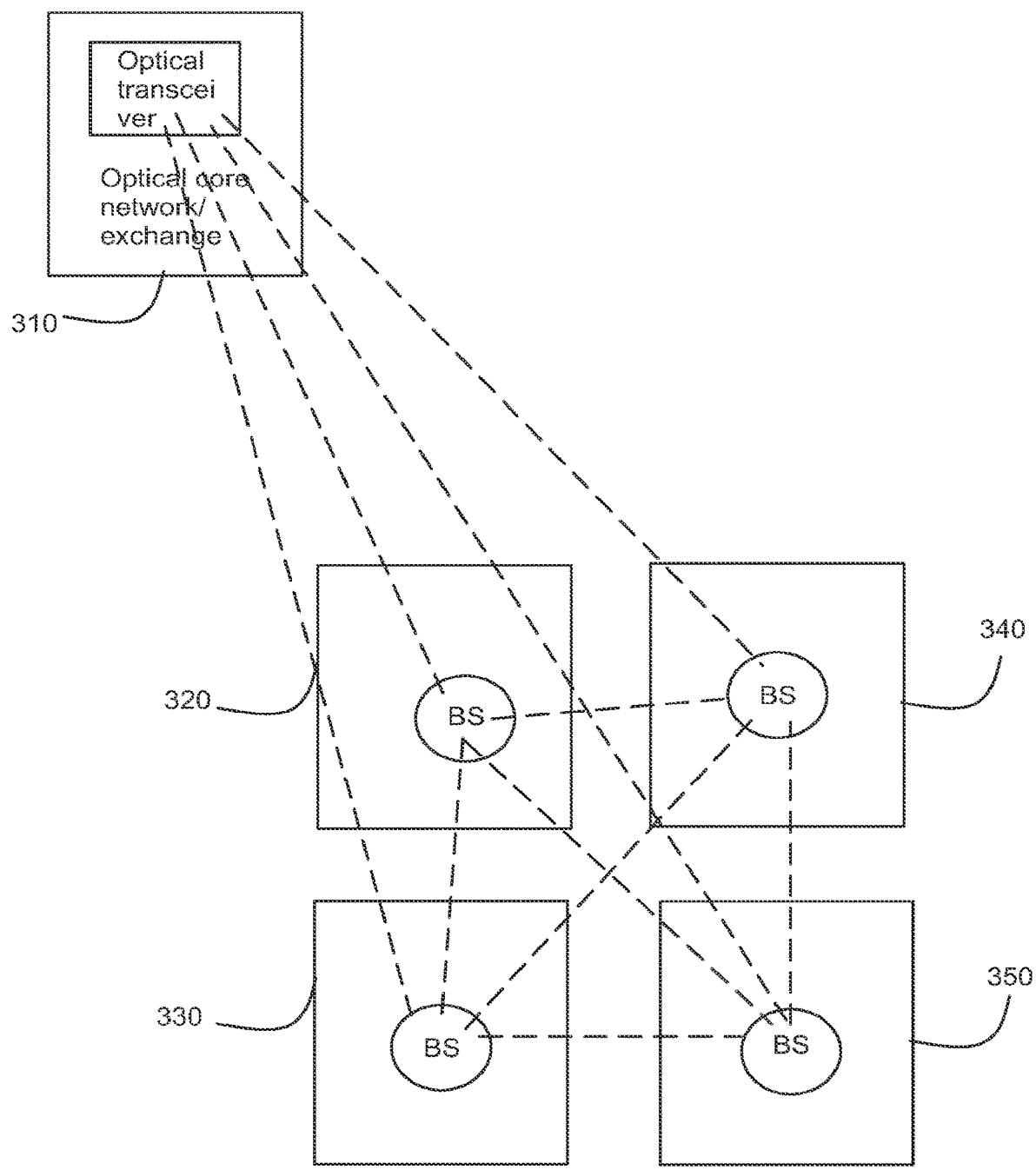
FIG. 3 demonstrates an embodiment 30 of the network of base stations in accordance with the invention as a block diagram.

FIG. 3 shows an embodiment of the network using the inventive base stations deployed in a city as a block diagram. The buildings 320, 330, 340, 350 each have the base stations of the invention on their roofs. The building 310 hosts an access point to the optical fibre network, and/or to the wireline communication network. In some embodiments it is an office building of the operator of the network of base stations (BS), for example the Central Office (CO) could reside in the building 310 in some embodiments.

The dashed lines in FIG. 3 present optical light beams, typically non-visible laser beams, that relay data optically through free space, which is air in this case. It is preferable to have line of sight connections to multiple base stations and/or optical transceivers rather than to just one. This is because the operator can configure the network to use a routing algorithm where if one line of sight connection fails, the data can be routed to the destination via an alternative route. Failure of one link can be due to optical transmitter failure, bird blocking the beam, or pointing misalignment due to movement of the base station and/or beam expander focus and/or pointing, and preferably the network is arranged to automatically detect these failures or a risk of these failures, so that correcting and/or pre-emptively correcting work can be begun by e.g. system engineer of the operator running the network. In some embodiments the signal strength of at least one optical link is measured and sent to a network administration computer, for example at/in the exchange and/or Central Office of the network operator.

By providing a wide spectral dynamic range at each laser link and many alternative optical link topologies between two points, the probability of the signal having an eventual path between two points is increased towards certainty, even when some optical link might malfunction at some or all wavelengths.

The optical receiver in the optical transceiver and/or the base station comprises typically some photon collector, such as a parabolic mirror, antenna, dish antenna, and/or a large lens. Especially very long wavelength optical photons, such as QCL emitted photons, can in some embodiments be received more expediently with a photon receiver that is a reflector and/or an antenna or a similar photon collector. I.e. it collects the incoming photons based on their wave like properties, rather than particle like properties. Typically the photon collector is arranged to focus and/or direct the collected photons to a photodiode.

Prior to optical fibre transmission, it is preferable to adapt the whole signal to fibre transmission. In one embodiment this is simply adapting the different wavelengths used in free space communication to fibre communication. A free space SONET signal at a SONET wavelength can be sent directly to the fibre with or without amplification in some embodiments. However, a SONET modulation compliant signal received with a QCL at for example 70,000 nm or some other different wavelength would preferably need to be adapted to the SONET wavelength, which is about 1550 nm in the IR.

In one preferred embodiment the inventive base stations are used especially by a new competing telecommunication operator that is trying to enter a new market and win customers from existing operators. In some embodiments, the network is arranged to automatically direct unregistered or unknown subscriber terminals to a webpage where they can register as customers to the network. For example, if the competing operator knows that broadband connections have been sold to a particular office building for 30 Euros/month, he can take a base station of the invention to the roof of that office building and arrange it to show a webpage to users that log into the network, where the users of the subscriber terminals can register as clients for only 20 Euros/month. When the users in the office building next log their subscriber terminals to the network of the competing operator they may simply sign on as customers with their credit cards, or postal addresses for billing, or the like. When the customers realise that the cells of the inventive base station are small enough to allow broadband over the wireless connection, they may well decide to abandon their existing fixed line contracts with their current original operators.

The invention is very cost efficient, as a broadband network can be created by a very small team of system engineers, an access point to optical core network, and a website+client data centre accepting and managing payments and/or customer subscriptions.

It should be noted that any features, phases or parts of the method 30 can be freely permuted and combined with embodiments 10 and/or 20 in accordance with the invention.

It should be noted that all embodiments of the invention can be used not only in duplex communication as described in the aforementioned, but also in broadcast communication, such as TV and/or radio.

The invention has been explained above with reference to the aforementioned embodiments and several commercial and industrial advantages have been demonstrated. The methods and arrangements of the invention allow great synergistic advantages that go beyond the sum of its parts. Using a FSO (free space optics) solution individually relieves the network operator from the need to build optical cables to the base station, but wire infrastructure would still need to be built, i.e. power cords. Similarly using the solar cell for a network base station relieves the operator from making sure grid electricity is available, but again an optical fibre would need to be built. The invention allows the system engineer merely to only request authorisation from the tenants to place the base station on the roof. There is no need to consult the tenants for permissions to conduct infrastructural changes to the building itself, such as providing a power cord to the roof, or allowing for optical fibre wiring to the roof or into the rooms of the building. The inventor has calculated that this saving should exceed more than 5000 Euros/building, which is the standard quoted rate that large telecommunications companies cite as the cost of connecting a central Helsinki building to optical broadband, in a situation where the operator has an optical fibre nearby and traffic is not intervened with by digging up streets. Needless to say, infrastructure work outside the building is far more costly, and can cost millions of Euros even for connections shorter than a kilometre if the connection needs to be built in a high cost urban environment where all disruptions to traffic etc. and other hindrances to the actual fibre or wire building work add to the cost.

Furthermore, the inventive base station is very cheap to manufacture in large quantities and numbers. Therefore the inventive base station has the added advantage that the cell size served by the base station can be made very small. This allows for the introduction of quite small very broadband radio cells, covering e.g. only the building, a particular floor, section and/or room of a building. These small very high bandwidth radio cells have the advantage that they can be used to substitute an optical fibre connection to a residential or office unit all together. The invention therefore allows for example for all 18 flats in an apartment building to enjoy $\frac{1}{18}$ part of the bandwidth of the whole antenna array at worst (everybody using), but might deliver the whole width of the radio/microwave band to the optical core network for one user (only one user accessing the network via the base station). Quite clearly this allows for video conferencing and other broadband applications to everybody at far more competitive commercial rates than people are used to today.

The invention has been explained above with reference to the aforementioned embodiments. However, it is clear that the invention is not only restricted to these embodiments, but comprises all possible embodiments within the spirit and scope of the inventive thought and the following patent claims.

REFERENCES

EP 1 476 968 B1, Mikko Kalervo Väänänen.
EP 2261996, Mikko Kalervo Väänänen.
EP 2226852, Mikko Kalervo Väänänen.
EP 08735694.5, Mikko Kalervo Väänänen.
EP 08803499.6, Mikko Kalervo Väänänen.
WO 2006/044519, Peter Healey at al.

The invention claimed is:

1. A portable base station (200), arranged to provide radio and/or microwave communication network access to at least one subscriber terminal (250, 251) via at least one radio and/or microwave transmitter and/or receiver, characterised in that,
   said portable base station comprises at least one free space laser and/or photodiode data communication transmitter and/or receiver (220, 221) comprising a photodiode laser and/or a quantum cascade laser arranged to transmit and/or receive directional photons in the visible to 100,000 nm wavelength range or in the visible to 1 mm wavelength range through free space,
   said portable base station comprises at least one tandem solar cell (240).

2. A base station (200) as claimed in claim 1, characterised in that, the said base station is arranged to receive at least one free space laser and/or photodiode signal from another first base station and/or optical transceiver and transmit said received free space laser and/or photodiode signal to a second base station and/or optical transceiver through free space.

3. A base station (200) as claimed in claim 2, characterised in that, an incoming free space laser and/or photodiode signal from another first base station and/or optical transceiver is arranged to be received and amplified and sent to another second base station and/or optical transceiver through free space and/or, the incoming free space laser and/or photodiode signal from the another first base station and/or optical transceiver is arranged to be received with a first free space laser and/or photodiode data communication receiver (221) and sent with a second free space laser and/or photodiode data communication transmitter (220) or the same first free space laser and/or the photodiode data communication receiver (221) or both said transmitter and/or receiver (220, 221) to another second base station and/or optical transceiver through free space.

4. A base station (200) as claimed in claim 1, characterised in that, the free space laser and/or the photodiode data communication transmitter and/or the receiver (220, 221) is a backhaul connection, arranged to simultaneously communicate a plurality of signals exchanged with the base station and a plurality of subscriber terminals to one or more destinations within the communication network beyond the free space laser and/or the photodiode (220, 221) via optical core network and/or other communication network.

5. A base station (200) as claimed in claim 1, characterised in that, at least one solar cell (240) is arranged to power said base station and/or store energy to a battery that is arranged to power the base station.

6. A base station (200) as claimed in claim 1, characterised in that, said base station does not have an electric socket for an external power cord and/or does not have an optical communication socket for an optical fibre connection.

7. A base station (200) as claimed in claim 1, characterised in that, said solar cell (240) is on the top face of the said base station and at least one free space laser and/or photodiode data communication transmitter and/or receiver (220, 221) is arranged to the side of the said base station, and/or at least one movable waveguide is arranged to point the said at least one free space laser and/or photodiode data communication transmitter and/or receiver (220, 221) to the line of sight direction of another base station and/or optical transceiver.

* * * * *